United States Patent [19]

Cleary

[11] Patent Number: 4,996,940
[45] Date of Patent: Mar. 5, 1991

[54] METHOD AND APPARATUS FOR INTERNALLY COATING AND STRENGTHENING CONDUIT

[76] Inventor: John J. Cleary, 925 S. 122nd St., West Allis, Wis. 53214

[21] Appl. No.: 437,641

[22] Filed: Nov. 17, 1989

[51] Int. Cl.[5] .......................... B05B 13/06; B05C 7/08
[52] U.S. Cl. .................................... 118/306; 118/317; 118/DIG. 10
[58] Field of Search ............... 118/306, 317, DIG. 10, 118/105

[56] References Cited

U.S. PATENT DOCUMENTS

| | | | |
|---|---|---|---|
| 1,787,126 | 12/1930 | Steinnes | 118/306 |
| 2,106,004 | 1/1938 | Inglee | 118/DIG. 10 |
| 3,106,735 | 10/1963 | Landrum et al. | 118/DIG. 10 |
| 3,334,389 | 8/1967 | Matheny | 118/105 |
| 3,960,644 | 6/1976 | McFadden | 118/306 |
| 4,125,089 | 11/1978 | Reusser | 118/105 |
| 4,308,824 | 1/1982 | Muta et al. | 118/105 |

Primary Examiner—Michael G. Wityshyn
Attorney, Agent, or Firm—Willis B. Swartwout, III

[57] ABSTRACT

Apparatus and method for impregnating and sealing and simultaneously improving the tensile strength of pipeline or conduit buried in the ground. The structure consists of a pair of axially spaced, deformable blocking and sealing devices whose interval is appropriately maintained. One of the blocking devices or "pigs" conveys conduit for introducing air under pressure greater than surrounding hydrostatic pressure on the conduit exterior to the space between the blocking devices to force out water or contaminants and also means for introducing two parts of a compound to impregnate, seal and bond to the interior conduit surface. The structure is also provided with a camera chip on the "pig" which contains the structure for conveying the air and the parts of the compound for observation by remote camera of the operation. The compound is a fast drying compound enabling relatively continuous operation by winching the structure along the conduit. The method to be practiced involves first selectively sealing off a section of conduit, then driving out the contaminating material by increasing the pressure within the sealed off section, and then spray in conical form the compound material and catalyst to quick dry and then axially moving on downstream in the conduit. Fibre or sand may be added to the compound for strength and plugs may be used to seal lateral apertures.

7 Claims, 3 Drawing Sheets

METHOD AND APPARATUS FOR INTERNALLY COATING AND STRENGTHENING CONDUIT

BACKGROUND OF THE INVENTION

The present invention relates to a method and apparatus for simultaneously coating and strengthening the inside surface of hollow pipe. It is understood that most of the pipe subjected to this method and apparatus would be concrete, clay or other similar aluminum silicate product used to carry water or sewage or the like. However, the process and even the apparatus could be adapted to plastic or metal conduit if the need arose.

Pipe, particularly conduit which is buried in the ground, made from a concrete or clay has a tendency to crack and leak from freezing and thawing as well as from pressure exerted on the exterior surface by trucks and machinery. Most of this type of pipe is buried beneath the surface of roadways or right of ways and is in sections that are joined together at customary intervals. Often the sections have a so called "man hole" at the points of intersection of the pipe sections so that access may be obtained to the interior of the pipe to service phone or electric lines, to deal with leaks of gas or just to service possible breaks or leaks.

Since replacement of underground pipe is expensive, not only due to cost of materials and labor but because the roadway must often be closed to traffic and torn up, it is desirable to be able to maintain such conduits usable for the longest possible time.

Impregnating the interior surfaces of such conduit against the flow of moisture or gases is of some help and has been tried in the past. A pipe liner is also a solution that has been tried. The liner forms a sort of pipe within a pipe and in some cases has been made from a material which deforms under heat and pressure such that an attempt can be made bond the liner to the interior conduit surface.

A part of the entire problem is that many of the conduits involved require apertures for the joining of "laterals" and other lines from smaller to larger pipes or mains as they are sometimes called.

Another problem that confronts the repair of such conduits or pipes is that many of them carry liquid and the liquid must be temporarily drained and re-routed. Also, leakage of surface water and the like into the conduit must be prevented by increasing the pressure within the conduit temporarily to a pressure greater than the exterior hydrostatic pressure around the pipe which causes the leaking in the first place.

It is impractical to attempt to hand seal each individual crack in the conduit and such crack does not make the pipeline or conduit stronger against the outside pressures against it which will result in further fissures and breaks. It is therefore most desirable to make the repairs and increase the tensile strength of the conduit at the same time if that can be accomplished.

SUMMARY OF THE INVENTION

The present invention proposes to provide a method and apparatus for simultaneously coating the interior of conduit formed from concrete, clay or the like to repair cracks and leaks in the conduit and at the same time to bond the coating material to the interior surface of the conduit in such a fashion as to increase the tensile strength of the conduit against forces exerted against the conduit.

It is another object of the present invention to provide structure for applying the surface coating internally in a spray-on manner.

It is another object of the present invention to provide structure of the character described above wherein a pair of spaced movable conduit blocking devices are included, which seal the conduit such that remaining moisture may be removed, the interior pressure raised to a level above the pressure on the exterior conduit surface and the spaced movable conduit blockers may be moved axially longitudinally along the conduit at the same rate so as to maintain their interval relative to each other.

It is still another object of the present invention to provide in a device of the character above described a spraying device attached to one of the blocking devices for spraying a wide conically shaped spray of sealing and surfacing material.

It is a further object of the present invention to provide in a device of the character above described means interconnecting the axially spaced blocking devices for unified axial movement.

It is still a further object of the present invention to provide in a device of the character above described conduit means interconnecting a remote pump for increasing air pressure in the conduit area defined between the blocking devices.

It is an additional object of the present invention to provide in a device of the character above described a tank, a second pump and second conduit means to hold and convey material in a liquid state to be conveyed to the spraying mechanism.

It is another additional object of the present invention to provide for use in conjunction with a device of the character above described a fast drying epoxy resin solution mixed with sand and/or fibres to simultaneously fill and repair cracks in the interior surface of a conduit formed of concrete, clay or the like and to dry rapidly into an impregnated liner for the conduit which will increase the tensile strength of the original conduit and liner in combination.

Other and further objects and advantages of the present invention will become obvious and apparent as this description proceeds as will various modifications and additional advantages which can be made to or obtained from the present invention without departing from the spirit thereof. It is intended that such additional objects and advantages, modifications and changes be covered by the scope of the appended claims.

DESCRIPTION OF THE PREFERRED EMBODIMENT

Figure 1:
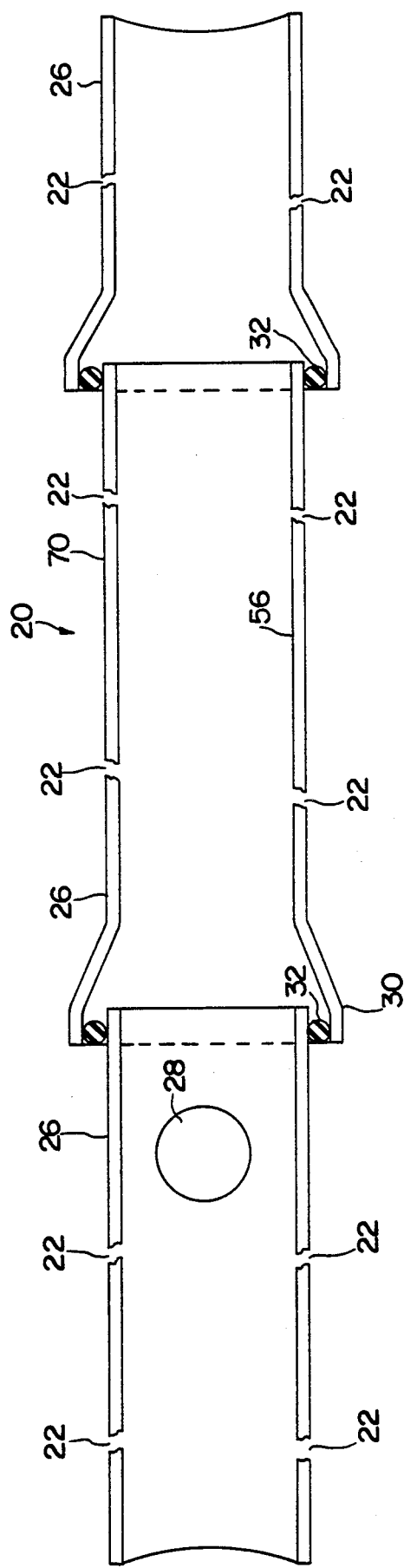
FIG. 1 is a vertical cross-sectional view through a conduit such as might be repaired by the present invention.

Referring now to the drawings and more particularly to FIG. 1 thereof a conduit is shown in vertical cross-section which is generally identified by the numeral 20. Conduit 20 is made from concrete or clay and is provided with a series of irregular apertures identified by the numeral 22. It should be noted that the apertures 22 are exaggerated in size for the purposes of this explanation and do not necessarily extend all the way through the entire circumference or external geometric cross-sectional shape of the conduit 20 but may extend through to the interior in some places.

Aside from the fact that apertures 22 weaken the tensile strength of conduit 20, they also permit water to leak into the pipe or conduit 20 because the hydrostatic pressure on the exterior surface of conduit 20 may exceed the existing pressure within conduit 20. In such case water 24 or other undesirable liquids may collect in the conduit 20.

Conduit 20 is divided into a plurality of conduit sections 26 which are joined together in longitudinal relationship. Sections 26 may be coaxial but do not necessarily have to be for the present invention to work effectively. Within the sections 26 are a plurality of apertures 28 for the receipt of lateral conduits, such as in water, sewer or gas mains. Also, at the area where each section 26 joins another section 26 there may be a "man hole" (not shown) for human access to the interior of the conduit. Such construction is old and well known in the art.

Note that each section 26 is provided with one bell-shaped end 30 which is adapted to receive in telescoping arrangement the end of section 26 remote from bell-shaped end 30 of the next succeeding section 26, with an O-ring seal or gasket 32 to seal the interior from undesirable ground water leakage. The gaskets or seals 32 may be made from rubber, neoprene or other similar deformable material which will effectuate a seal be virtue of deforming action when the sections 26 are joined together as indicated.

Figure 2:
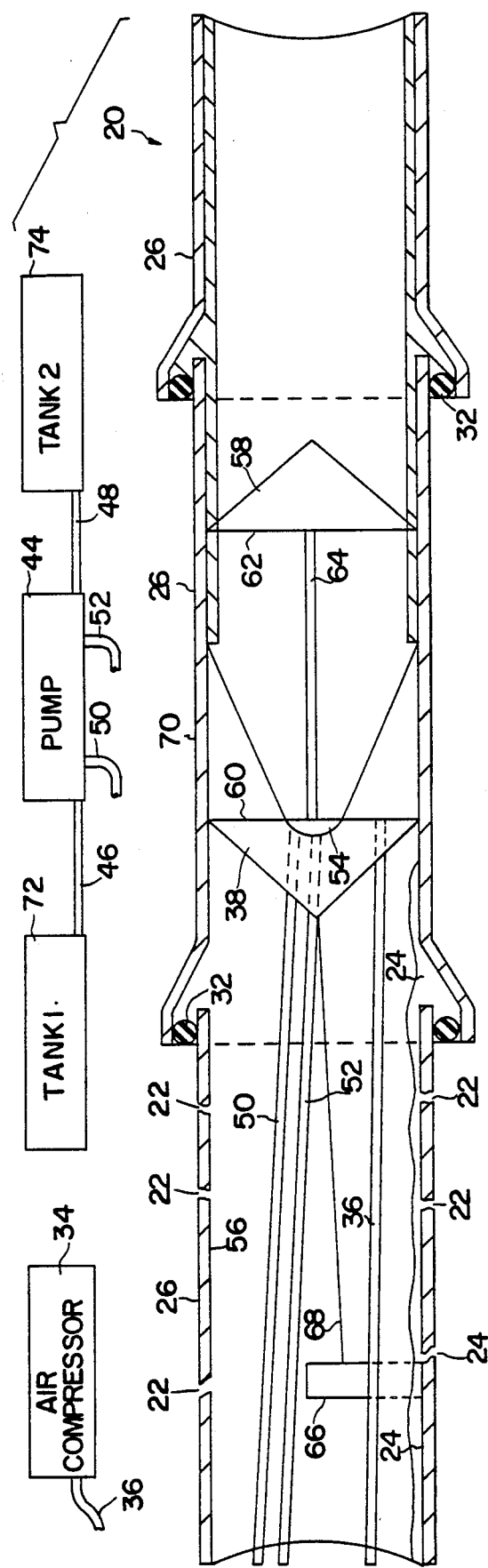
FIG. 2 is a view similar to FIG. 1, with the mechanism of the present invention in place for repairing and lining the conduit and disclosing equipment of the invention located remote from the conduit interior.
Figure 4:
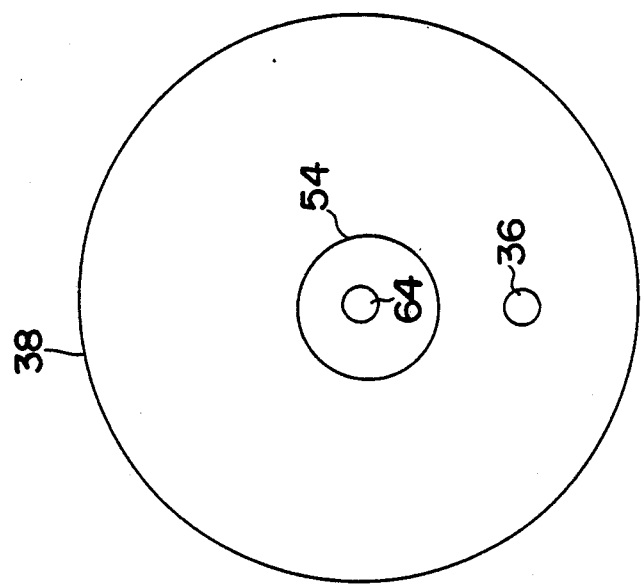
FIG. 4 is a vertical end elevational view of the "pig" shown in FIG. 3, viewed from the blunt end.
Figure 3:
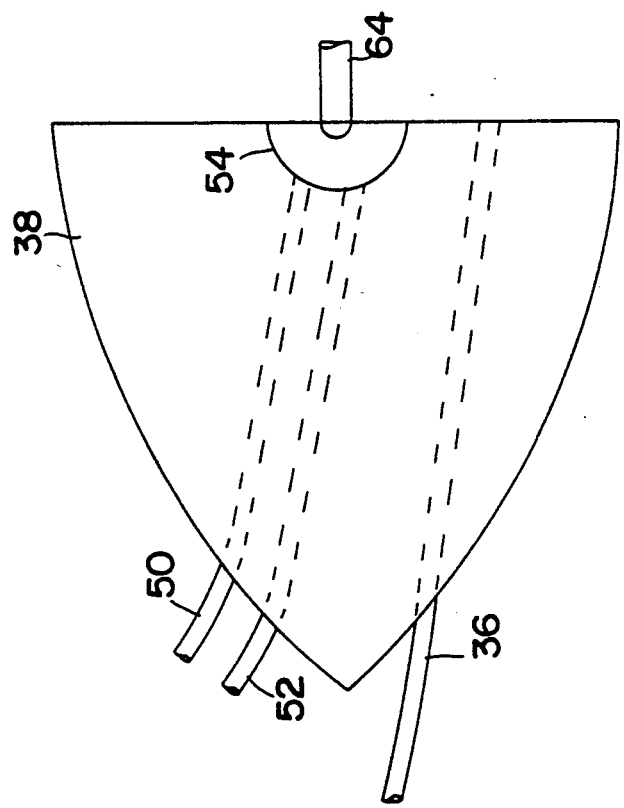
FIG. 3 is an enlarged vertical elevational side view of a pipeline "pig" such as forms a part of the structure of the present invention.

Referring now more particularly to FIG. 2 of the drawings, an air compressor 34 is disclosed externally of conduit 20. In theory compressor 34 could be disposed some where within the conduit 20 or on the surface of the ground outside of conduit 20 if that is more desirable. Compressor 34 has an outlet conduit 36 which extends from the compressor to a first pipeline "pig" 38. Also disposed within conduit 20 or externally thereof as a matter of choice and convenience are a first tank 72, a second tank 74 and a pump 44. Tanks 72 and 74 are respectively joined to pump 44 by first tank line 46 and second tank line 48. Pump 44 has a first pump pressure outlet conduit 50 and a second pump pressure outlet conduit 52 which extend to spray nozzle 54 in pig 38.

Note from examining FIG. 2 of the drawings that spray nozzle 54 in the preferred embodiment is designed to spray out material in a conical fashion to impregnate and coat the interior surface 56 of the pipe sections 26 as well as to penetrate existing cracks or apertures 22 and close them. Also note that the areas around gaskets or seals 32 are filled. As gaskets or seals 32 age they deteriorate and loose the resiliency which they initially have thereby making the pipe section 26 joints subject to water leakage.

At this point it is well to point out that the pipe sections to be repaired and resurfaced must be relatively free of substantial liquid and to that end two things must be accomplished. First, a section of pipe must be isolated and cut off from atmosphere and the pressure therein increased. To that end a second pipeline "pig" 58 is located within conduit 20 axially spaced from first "pig". In the preferred embodiment of the invention "pigs" and 58 are generally conical in shape, and the teaching is that their respective points are pointed in opposite axial direction away from each other. The base 60 of "pig" 38 and the base 62 of "pig" 58, therefore face toward each other and are appropriately interconnected with a fabricated fibre or metal cable 64. "Pigs" 38 and 58 are formed from a resilient deformable material such as polyurethane foam and are larger in cross-sectional geometric configuration than the internal diameter or geometric cross-sectional dimension of the pipeline 20. The purpose is so that the "pigs" 38 and 58 make frictional sealing engagement with the interior surface 56. A winch 66 and tow cable 68 interconnecting winch 66 and the apex of "pig" 38 are used to tow the assembly through conduit 20 in the direction of flow of conduit 20.

Once the "pigs" 38 and 58 are in axially spaced relationship within conduit 20 such as shown in FIG. 2, compressor 34 and outlet conduit 36 are used to raise the pressure within the section of conduit 20 between the "pigs" 38 and 58 to a level sufficiently in excess of the hydrostatic pressure surrounding the exterior surface 70 of pipeline sections 26 of pipeline 20 so as to force out through the joints, apertures 22 and cracks any water 24 that may remain therein.

Tank one, identified by the numeral 72, is filled with an appropriate resin material in liquid form and tank two, identified by the numeral 74, is filled with and appropriate catalyst or curative such that when they are united within and sprayed from nozzle 54 the compound rapidly penetrates the cracks, apertures 22 and the joints and the porous inner surface 56 bonding therewith and hardening quickly both to seal and increase the tensile strength thereof.

Since the area being treated must be sealed off to maintain the desired pressure, the "pig" 38 is further provided with a television camera chip 76 appropriately remotely connected to viewing apparatus (not shown) so that the operator may view the effectiveness of water removal and application of the spray on liner material.

It can now be seen that by use of the winch 66 and tow cable 68 the apparatus may be gradually drawn downstream axially along the pipeline or conduit 20, even if the respective sections are somewhat canted relative to each other, and the entire interior surface resealed against leakage and simultaneously increased in tensile strength. If the conduit 20 has lateral apertures 28 they may be temporarily appropriately plugged during the operation. This would be required in any event as pressure increase within conduit 20 would blow out or off any lateral cover or seal at the other end of the lateral within a home or building.

I claim:

1. Apparatus for repairing, sealing and increasing the tensile strength of conduit comprising:
   (a) a pair of axially spaced, deformable sealing devices being greater in cross-sectional dimension than the internal cross-sectional dimension of the conduit for sealing off a section of conduit from external communication;
   (b) means connected to said devices for maintaining an axial spacing between said devices, when one of said devices is moved in an axial direction of said conduit;

(c) means located externally of the spaced devices for generating air under pressure greater than the external pressure on said conduit, and an air outlet conduit extending from said generating means through one of said devices to a space defined between said devices for raising the pressure within the sealed off section to a pressure greater than the pressure externally of the sealed off section;

(d) a dispensing means comprising a plurality of tanks for holding separatedly a plurality of elements of a compound for sealing, repairing and increasing the tensile strength of the conduit, a pump connected to said plurality of tanks, and a plurality of pressure outlet conduits connected to said pump and to a spraying device on said one sealing device internally relative to the space defined by said devices for combining and spraying the plurality of elements of the compound onto the conduit; and (e) means for towing said apparatus axially within and relative to said conduit.

2. The apparatus as set forth in claim 1, wherein said pair of axially spaced, deformable sealing devices are conically shaped and formed from polyurethane foam, the base of each conically shaped cone being slightly greater in cross-sectional dimension than the cross-sectional dimension of the interior of the conduit.

3. The apparatus as set forth in claim 1, wherein said pair of axially spaced, deformable sealing devices are joined at their spaced facing surfaces to maintain their relative axial spacing when one of said devices is towed from a non-facing surface thereof in an axial direction of said conduit.

4. The apparatus as set forth in claim 1, wherein said means located externally of the space between said axially spaced devices includes an air compressor and pressure hose, the air compressor located outside of the conduit and the hose extending from the air compressor through one of said devices to the surface thereof facing toward the other of said devices.

5. The apparatus as set forth in claim 1, wherein said plurality of tanks include first and second tanks and means joining said first and second tanks to said pump for pumping the elements of the compound from said first and second tanks simultaneously, said plurality of pressure outlet conduits include first and second pressure outlet conduits for respectively conveying the elements of said first and second tanks under pressure from said pump through said first and second pressure outlet conduits, and said spraying device includes a spray nozzle designed to spray a generally conical spray pattern of the combined elements of the compound.

6. The apparatus as set forth in claim 1, wherein the means for towing said apparatus includes a winch located within said conduit at a point remote from said sealing devices and a tow cable windably attached at one end to said winch and at the other end to a surface of one of said sealing devices facing away from the other of said sealing devices.

7. The apparatus as set forth in claim 1, in further combination with a camera chip located on one of said sealing devices on a surface facing the other of said sealing devices and a viewing screen electronically interconnected to said chip for transmission and reception whereby an operator may view the area of said conduit between said sealing devices.

* * * * *